US008365071B2

United States Patent
Fux et al.

(10) Patent No.: US 8,365,071 B2
(45) Date of Patent: Jan. 29, 2013

(54) HANDHELD ELECTRONIC DEVICE AND ASSOCIATED METHOD ENABLING PHONETIC TEXT INPUT IN A TEXT DISAMBIGUATION ENVIRONMENT AND OUTPUTTING AN IMPROVED LOOKUP WINDOW

(75) Inventors: Vadim Fux, Waterloo (CA); Sergey V. Kolomiets, Waterloo (CA); Alexander Kornilovsky, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1029 days.

(21) Appl. No.: 12/046,698

(22) Filed: Mar. 12, 2008

(65) Prior Publication Data
US 2009/0235165 A1 Sep. 17, 2009

(51) Int. Cl.
*G06F 17/00* (2006.01)
(52) U.S. Cl. ........ 715/262; 715/264; 715/773; 715/816; 345/156; 345/167; 345/169; 345/171; 345/173
(58) Field of Classification Search .......... 715/256–259, 715/262, 264–265, 773, 816; 345/156, 161, 345/167, 168–169, 171, 173; 341/22, 23, 341/28; 704/9, 257, 1–3, 235
See application file for complete search history.

(56) References Cited

U.S. PATENT DOCUMENTS

| 6,848,080 | B1 * | 1/2005 | Lee et al. ...................... 715/203 |
| 7,385,531 | B2 * | 6/2008 | Zhang .............................. 341/28 |
| 7,395,203 | B2 * | 7/2008 | Wu et al. ........................ 704/235 |
| 2005/0027524 | A1 * | 2/2005 | Wu et al. ........................ 704/235 |
| 2005/0027534 | A1 | 2/2005 | Meurs et al. |
| 2005/0144566 | A1 * | 6/2005 | Zhang ............................. 715/810 |
| 2005/0268231 | A1 * | 12/2005 | Wen et al. ...................... 715/534 |
| 2007/0118351 | A1 | 5/2007 | Sumita |
| 2009/0037837 | A1 * | 2/2009 | Raghunath et al. ........... 715/773 |

FOREIGN PATENT DOCUMENTS
WO WO 2005/013054 2/2005

OTHER PUBLICATIONS

First Office Action, mailed Dec. 10, 2009 from Japanese Patent Office for Japanese Application No. 2008-074465, with English translation (9 pages).
Second Office Action, mailed Jun. 8, 2010 from Japanese Patent Office for Japanese Application No. 2008-074465, with English translation (6 pages).

(Continued)

*Primary Examiner* — Cesar Paula
*Assistant Examiner* — James H Blackwell
(74) *Attorney, Agent, or Firm* — Finnegan, Henderson, Farabow, Garrett & Dunner, LLP

(57) ABSTRACT

An improved handheld electronic device and associated method enable the phonetic inputting of text using a reduced keyboard and transformation algorithm. The handheld electronic device and method advantageously enable the inputting of languages such as Chinese, Japanese, Korean, and the like without limitation. The transformation algorithm subjects each of a number of linguistic element permutations to an algorithm such as the Maximum Matching Algorithm or other algorithm to generate a string of words and selects one string of words as a default textual output. The character interpretation and variations thereof are output in a lookup component along with a pin and variants thereof to enable the user to select among various character interpretations of an input as well as various alternative pins that correspond with the input.

21 Claims, 9 Drawing Sheets

OTHER PUBLICATIONS

First Office Action, mailed May 12, 2010 from State Intellectual Property Office of People's Republic of China for Chinese Application No. 200810107949.6, filed May 21, 2008, with English translation (84 pages).

Office Action from the Taiwanese Patent Office in Application 097110869, dated Mar. 16, 2012, and English translation (15 pages).

* cited by examiner

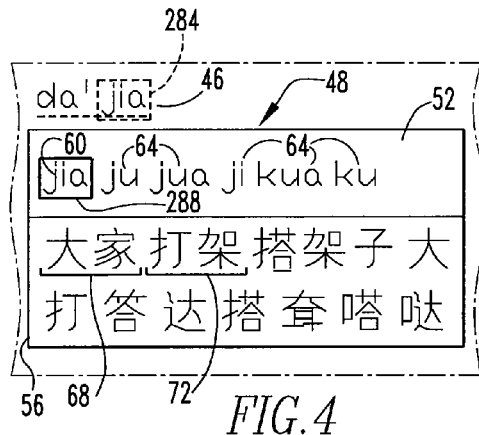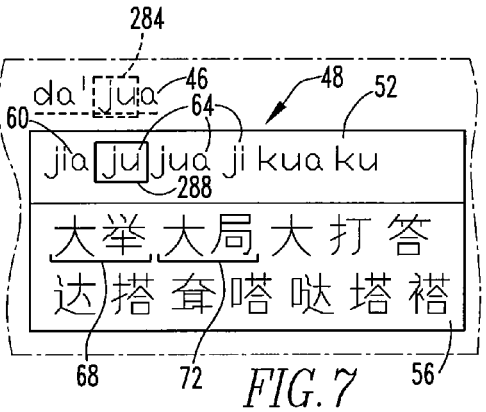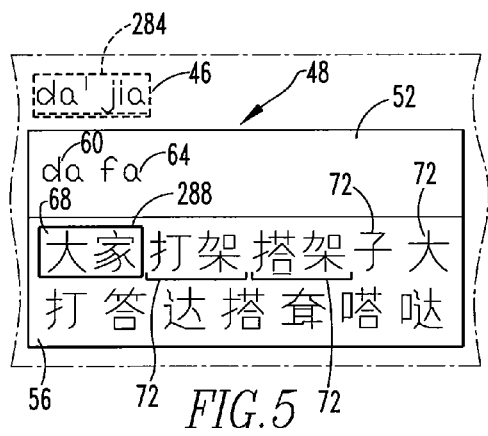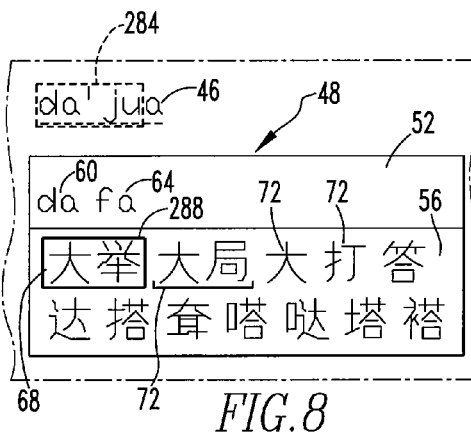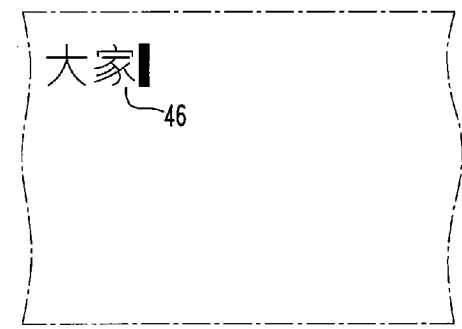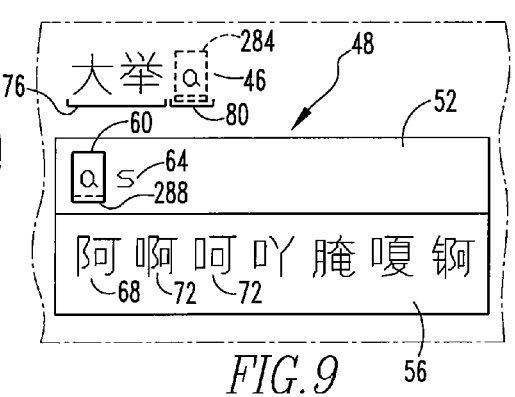

HANDHELD ELECTRONIC DEVICE AND ASSOCIATED METHOD ENABLING PHONETIC TEXT INPUT IN A TEXT DISAMBIGUATION ENVIRONMENT AND OUTPUTTING AN IMPROVED LOOKUP WINDOW

CROSS-REFERENCE TO RELATED APPLICATION

The instant application claims priority from U.S. Provisional Patent Application Ser. No. 60/969,393 filed Aug. 31, 2007, the disclosures of which are incorporated herein by reference.

BACKGROUND

1. Field

The disclosed and claimed concept relates generally to handheld electronic devices and, more particularly, to a handheld electronic device and method that enable the phonetic inputting of text in a text disambiguation environment and the outputting of an improved lookup window.

2. Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

In certain circumstances, a handheld electronic device having a keypad of Latin letters can be employed to phonetically enter text in languages that are not based upon Latin letters. For instance, Pinyin Chinese is a type of phonetic Chinese "alphabet" which enables transcription between Latin text and Standard Mandarin text. Pinyin Chinese can thus enable the input of Standard Mandarin characters by entering Latin letters. A "pin" is a phonetic sound, oftentimes formed from a plurality of Latin letters, and each pin is associated with one or more Standard Mandarin characters. More than four hundred pins exist, and each pin typically corresponds with a plurality of different Standard Mandarin characters.

Generally each Standard Mandarin character is itself a Chinese word. Moreover, a given Standard Mandarin character in combination with one or more other Standard Mandarin characters can constitute a different word. An exemplary pin could be phonetically characterized as "da", which would be input on a Latin keyboard by actuating the <D> key followed by an actuation of the <A> key. However, the pin "da" corresponds with a plurality of different Standard Mandarin characters. The pin "da" can be a single-syllable word in the Chinese language that is represented by a single Standard Mandarin character. The pin "da" can also be a single syllable represented by a Standard Mandarin character within a Chinese word having a plurality of syllables, with each syllable being represented by a Standard Mandarin character. As such, substantial difficulty exits in determining which specific Standard Mandarin character should be output in response to an input of a pin when the pin corresponds with a plurality of Standard Mandarin characters.

As the Latin letters of a Pinyin input are being typed they potentially can be segmented into different pins. For instance, a string of Latin letters might correspond with a given pin, but the Latin letters might also correspond with an initial portion of a longer pin. This adds another layer of ambiguity to resolving a string of Latin letters into Standard Mandarin characters.

Numerous methodologies have been developed to assist in generating a Standard Mandarin character interpretation for a series of Latin letters that have been input on a device. For instance, an exemplary algorithm would be the "simple maximum matching" algorithm, which is one transformation algorithm among many, both simple and complex, of the well known Maximum Matching Algorithm. A given device may have stored thereon a number of Chinese words comprised of one or more Standard Mandarin characters, and the transformation algorithm(s) that are executed on the device may employ such linguistic data to develop the best possible Standard Mandarin character interpretation of a series of input Latin letters.

In response to the inputting of a sequence of Latin letters, the aforementioned simple maximum matching algorithm might generate a character interpretation comprising the largest Chinese words, i.e., the words having the greatest quantity of Standard Mandarin characters. For example, the algorithm might, as a first step, obtain the largest Chinese word having Standard Mandarin characters that correspond with the pins at the beginning of the pin sequence. As a second step, the algorithm might obtain the largest Chinese word having Standard Mandarin characters that correspond with the pins in the sequence that immediately follow the previous word. This is repeated until Chinese words have been obtained for all of the pins in the input sequence. The result is then output.

A "complex maximum matching algorithm" might perform a similar analysis but further resolve pins into strings of three Chinese words. That is, the transformation algorithm might identify the string of three Chinese words that comprise the most Standard Mandarin characters that correspond with at least a portion of a pin sequence. The transformation algorithm would then output the first of the three Chinese words as being the best interpretation of that portion of the pin sequence. The transformation algorithm would then repeat the same analysis beginning with the pins immediately after the first Chinese word.

As a general matter, the various versions of the Maximum Matching Algorithm seek in one way or another to resolve a string of Latin letters into a string of Standard Mandarin characters that make up the fewest Chinese words. While such transformation algorithms have been generally effective for their intended purpose, such transformation algorithms have not been without limitation due, for example, to the ambiguity inherent in phonetic language input. It thus would be desired to provide an improved method and handheld electronic device that facilitate the input of text.

BRIEF DESCRIPTION OF THE DRAWINGS

A full understanding of the disclosed and claimed concept can be gained from the following Description when read in conjunction with the accompanying drawings in which:

FIG. 4 is an exemplary output during a text entry operation on the handheld electronic device;

FIG. 5 is an exemplary output during another portion of text entry operation;

FIG. 6 is an exemplary output during another portion of text entry operation;

FIG. 7 is an exemplary output during another text entry operation on the handheld electronic device;

FIG. 8 is an exemplary output during another portion of the other text entry operation;

FIG. 9 is an exemplary output during another portion of the other text entry operation;

Similar numerals refer to similar parts throughout the specification.

DESCRIPTION

Figure 1:
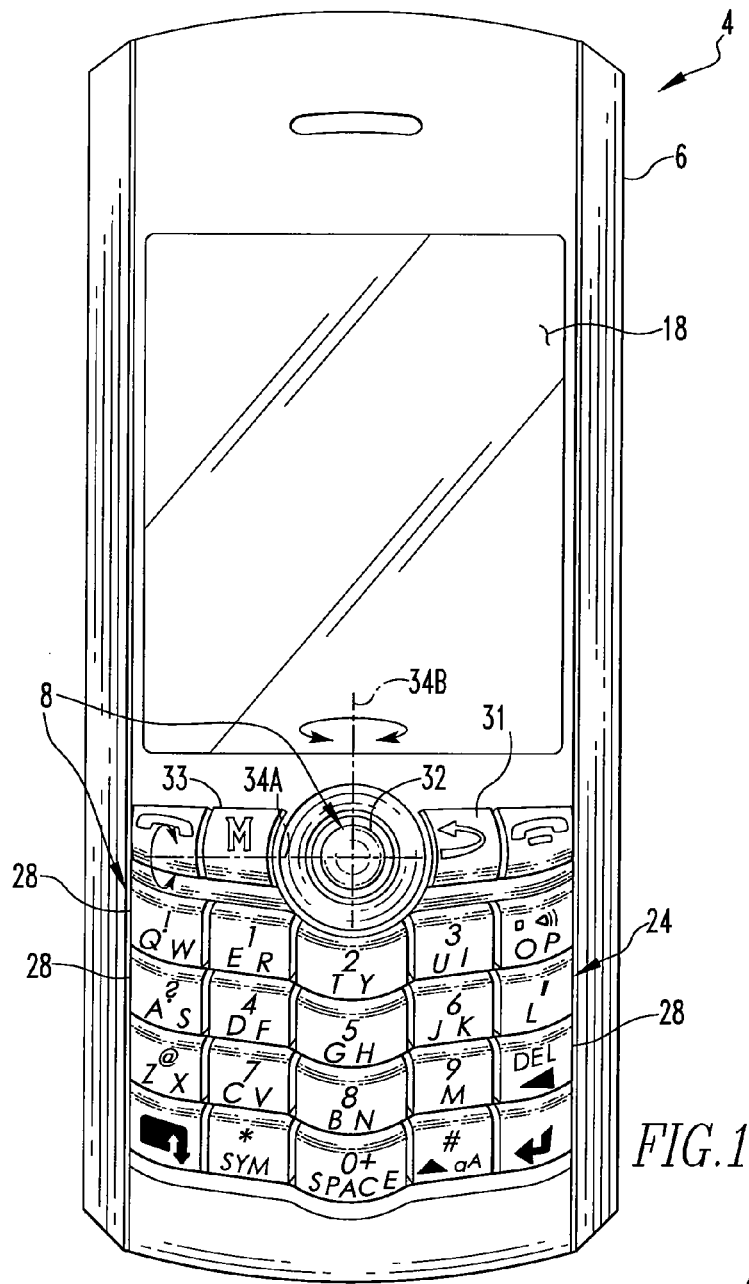
FIG. 1 is a top plan view of an improved handheld electronic device in accordance with the disclosed and claimed concept.
Figure 2:
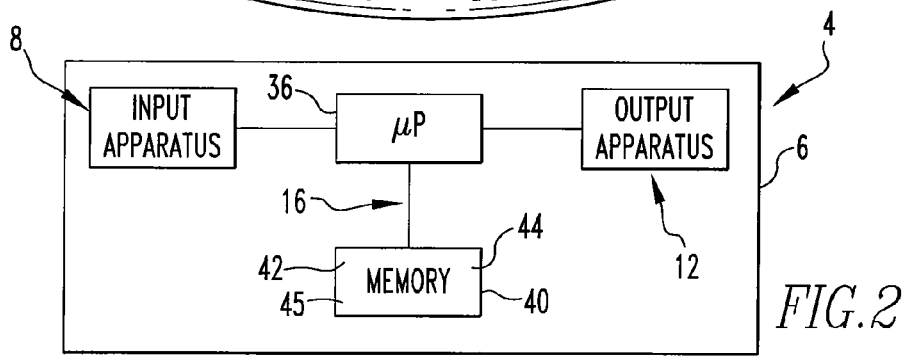
FIG. 2 is a schematic depiction of the improved handheld electronic device of FIG. 1.

An improved handheld electronic device 4 is indicated generally in FIG. 1 and is depicted schematically in FIG. 2. The exemplary handheld electronic device 4 includes a housing 6 upon which are disposed an input apparatus 8, an output apparatus 12, and a processor apparatus 16. The input apparatus 8 is structured to provide input to the processor apparatus 16, and the output apparatus 12 is structured to receive output signals from the processor apparatus 16. The output apparatus 12 comprises a display 18 that is structured to provide visual output, although other output devices such as speakers, LEDs, tactile output devices, and so forth can be additionally or alternatively used.

As can be seen in FIG. 2, the processor apparatus 16 comprises a processor 36 and a memory 40. The processor 36 may be, for instance and without limitation, a microprocessor (μP) that is responsive to inputs from the input apparatus 8 and that provides output signals to the output apparatus 12. The processor 36 interfaces with the memory 40.

The memory 40 can be said to constitute a machine-readable medium and can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 40 has stored therein a number of routines 44 which are executable on the processor 36. As employed herein, the expression "a number of" and variations thereof shall refer broadly to any non-zero quantity, including a quantity of one. The routines 44 can be in any of a variety of forms such as, without limitation, software, firmware, and the like.

As will be explained in greater detail below, the routines 44 include a text transformation algorithm routine 44, as well as other routines. The transformation algorithm 44 is employable to enable phonetic text input by converting ambiguous Latin text inputs into Chinese word output. The memory 40 also has stored therein a dictionary 42, a character table 45, and other linguistic data sources that are used by the transformation algorithm 44 to provide responses to ambiguous text inputs. It is noted that the Chinese language is used as an exemplary language herein, and it is further understood that other languages such as Japanese and Korean, for example, could similarly be phonetically input on the handheld electronic device 4 without departing from the present concept. That is, the handheld electronic device 4 is described herein in an exemplary fashion as being configured for the phonetic inputting of the Chinese language via transliteration between Latin letters and Chinese characters, and it is understood that in other embodiments the handheld electronic device could be configured to input, for instance, Japanese or Korean text or text in another language without departing from the present concept.

As can be understood from FIG. 1, the input apparatus 8 includes a keypad 24 and a multiple-axis input device which, in the exemplary embodiment depicted herein, is a track ball 32 that will be described in greater detail below. The keypad 24 comprises a plurality of keys 28 in the exemplary form of a reduced QWERTY keyboard, meaning that at least some of the keys 28 each have a plurality of linguistic elements assigned thereto, with at least some of the linguistic elements being Latin letters arranged generally in a QWERTY configuration. The keys 28 and the track ball 32 all serve as input members that are actuatable to provide input to the processor apparatus 16. The keypad 24 and the track ball 32 are advantageously disposed adjacent one another on a front face of the housing 6. This enables a user to operate the track ball 32 substantially without moving the user's hands away from the keypad 24 during a text entry operation or other operation.

Figure 10:
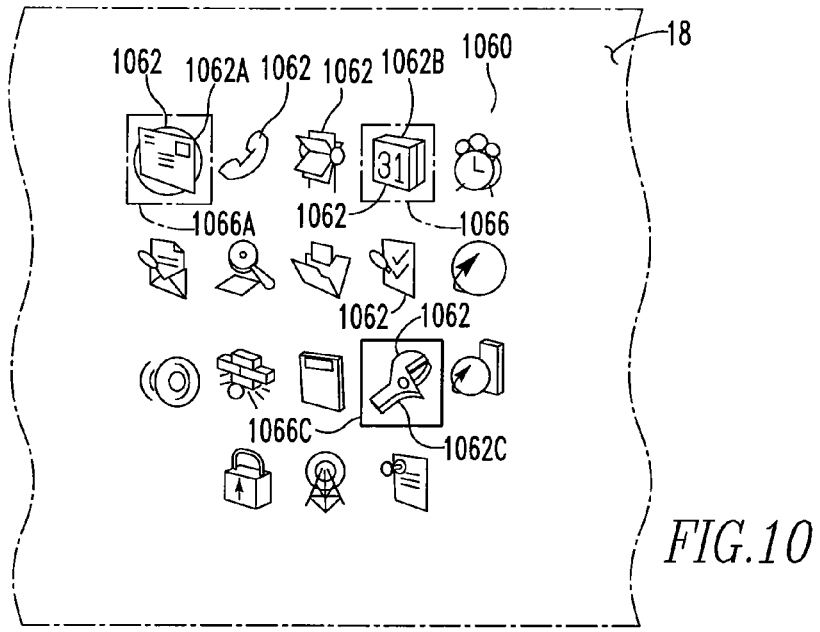
FIG. 10 is an exemplary home screen that can be visually output on the handheld electronic device.

One of the keys 28 is an <ESCAPE> key 31 which, when actuated, provides to the processor apparatus 16 an input that undoes the action which resulted from the immediately preceding input and/or moves the user to a logically higher position within a logical menu tree managed by a graphical user interface (GUI) routine 44. The function provided by the <ESCAPE> key 31 can be used at any logical location within any portion of the logical menu tree except, perhaps, at a home screen such as is depicted in FIG. 10. The <ESCAPE> key 31 is advantageously disposed adjacent the track ball 32 thereby enabling, for example, an unintended or incorrect input from the track ball 32 to be quickly undone, i.e., reversed, by an actuation of the adjacent <ESCAPE> key 31.

Another of the keys 28 is a <MENU> key 33 which, when actuated, provides to the processor apparatus 16 an input that causes the GUI 44 to generate and output on the display 18 a menu such as is depicted in FIG. 9. Such a menu is appropriate to the user's current logical location within the logical menu tree, as will be described in greater detail below. It is noted that menus and other subject matter that is not directly related to the transformation algorithm 44 is depicted in an exemplary fashion herein in the English language, although this is not intended to be limiting.

While in the depicted exemplary embodiment the multiple-axis input device is the track ball 32, it is noted that multiple-axis input devices other than the track ball 32 can be employed without departing from the present concept. For instance, other appropriate multiple-axis input devices could include mechanical devices such as joysticks and the like and/or non-mechanical devices such as touch pads, track pads and the like and/or other devices which detect motion or input in other fashions, such as through the use of optical sensors or piezoelectric crystals.

The track ball 32 is freely rotatable in all directions with respect to the housing 6. A rotation of the track ball 32 a predetermined rotational distance with respect to the housing 6 provides an input to the processor apparatus 16, and such inputs can be employed by the routines 44, for example, as navigational inputs, scrolling inputs, selection inputs, and other inputs.

For instance, and as can be seen in FIG. 1, the track ball 32 is rotatable about a horizontal axis 34A to provide vertical scrolling, navigational, selection, or other inputs. Similarly, the track ball 32 is rotatable about a vertical axis 34B to provide horizontal scrolling, navigational, selection, or other inputs. Since the track ball 32 is freely rotatable with respect to the housing 6, the track ball 32 is additionally rotatable about any other axis (not expressly depicted herein) that lies within the plane of the page of FIG. 1 or that extends out of the plane of the page of FIG. 1.

The track ball 32 can be said to be a multiple-axis input device because it provides scrolling, navigational, selection, and other inputs in a plurality of directions or with respect to a plurality of axes, such as providing inputs in both the vertical and the horizontal directions. It is reiterated that the track ball 32 is merely one of many multiple-axis input devices that could be employed on the handheld electronic device 4. As such, mechanical alternatives to the track ball 32, such as a joystick, might have a limited rotation with respect to the housing 6, and non-mechanical alternatives might be immovable with respect to the housing 6, yet all are capable of providing input in a plurality of directions and/or along a plurality of axes.

The track ball 32 additionally is translatable toward the housing 6, i.e., into the plane of the page of FIG. 1, to provide additional inputs. The track ball 32 could be translated in such a fashion by, for example, a user applying an actuating force to the track ball 32 in a direction toward the housing 6, such as by pressing on the track ball 32. The inputs that are provided to the processor apparatus 16 as a result of a translation of the track ball 32 in the indicated fashion can be employed by the routines 44, for example, as selection inputs, delimiter inputs, or other inputs.

The dictionary 42 in the exemplary embodiment depicted herein is a Chinese dictionary, meaning that it includes Chinese words each comprised of one or more Standard Mandarin characters. The exemplary character table 45 is a Pinyin Chinese character table, meaning that it includes a plurality of language objects in the form of Chinese pins and, associated with each pin, the various Standard Mandarin characters that correspond with the pin. Each of the language objects, i.e., pins in the present example, comprise one or more linguistic elements such as those assigned to the keys 28 of the keypad 24.

In accordance with the disclosed and claimed concept, the handheld electronic device 4 and the transformation algorithm 44 advantageously enable ambiguous text input that is comprised of Latin letters and that has been input using the keypad 24 to be transformed into a character interpretation which, in the present example, is text in the Chinese language and includes Standard Mandarin characters, i.e., a character interpretation. The transformation algorithm 44 therefore advantageously enables the resolution of the additional level of ambiguity that is imparted to Pinyin Chinese input using the reduced QWERTY keypad 24 having a plurality of different Latin letters assigned to each of many of the keys 28.

As will be described in greater detail below, the transformation algorithm 44 on the handheld electronic 4, in conjunction with the GUI 44, advantageously enables the outputting of a proposed character interpretation of an ambiguous text input by simultaneously providing multiple types of information. The transformation algorithm 44 thus enables the accurate phonetic inputting of text in the Chinese language, for example, despite the additional ambiguity inherent in inputting Latin letters using the reduced keypad 24. Specifically, and as will be set forth in greater detail below with regard to FIGS. 4-5 and 7-9, the GUI advantageously provides as an output a text input component 46 and a lookup component 48. The text input component 46 typically includes a string of language objects, i.e., pins written in Latin letters, that correspond with the input from the keypad 24, as is depicted in FIGS. 4-5 and 7-8, or it can include a character interpretation of the input, such as in the form of Chinese words comprised of Standard Mandarin characters, as is indicated generally in FIGS. 6 and 9, or it can include both as is indicted generally in FIG. 9. That is, and as can be seen in FIG. 9, in certain circumstances portions of the pins at the text input component 46 are replaced with Chinese words comprising Standard Mandarin characters to form a word portion 76 of the text input component 46. Any remaining portion of the string of pins at the text input component 46 that has not been converted into Chinese words remains as pins or pin portions or both that are comprised of Latin letters and that form a pin portion 80 of the text input component 46.

The lookup component 48 is in the nature of a lookup window that is output on the display 18 at a location different than that of the text input component 46. The lookup component 48 advantageously includes a pin region 52 and a text region 56. In certain circumstances, the pin region 52 includes as a default pin 60 one of the pins that is output at the text input component 46 and additionally may include one or more variant pins 64 that are selectable as alternatives to the default pin 60. In certain circumstances, the text region 56 comprises a default character interpretation 68 of at least an initial portion of the pin portion 80 of the output at the text input component 46 and additionally includes, as appropriate, one or more variant character interpretations 72 of the same initial portion or a different initial portion of the pin portion 80.

The various displayed objects in the lookup component 48, i.e., the default and variant pins 60 and 64 and the default and variant character interpretations 68 and 72, for example, advantageously are all selectable by the user during text input in order to enable the user to expressly indicate the particular pin and/or character interpretation that was intended to be input by the user in typing the ambiguous text input. The contents of the text input component 46 and the lookup component 48 are, at least initially, generated by the transformation algorithm 44 in response to an ambiguous text input from the keypad 24.

Figure 3A:
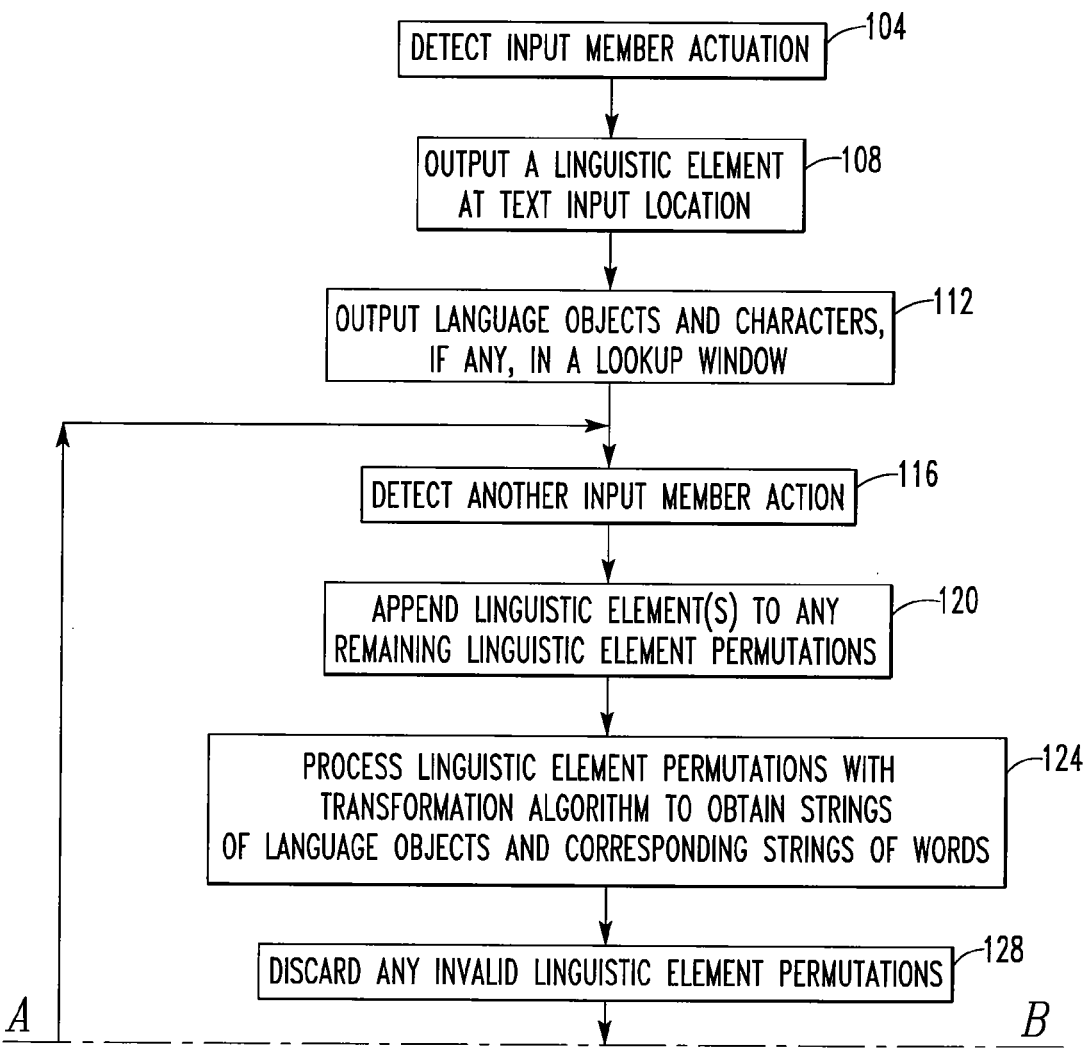
FIG. 3 is a flowchart depicting portions of an improved method in accordance with the disclosed and claimed concept.

The operation of the transformation algorithm 44 is described generally in conjunction with the flowchart that is depicted generally in FIG. 3. The method begins with the detection of an input member actuation, as at 104, i.e., an actuation of an input member having a number of linguistic elements assigned thereto. Responsive thereto, the GUI 44 outputs as at 108 a linguistic element at a text input location, i.e., where the text input component 46 is displayed. Also, to the extent that any language objects, i.e., pins, and Standard Mandarin characters exist that correspond with the input member actuation at 108, they are output at the lookup component 48 in a lookup window. In this regard, it is understood that very few pins consist of a single Latin letter. As such, it is possible that virtually no output will be provided in the lookup component 48 in response to the first input member actuation at 104.

However, the linguistic elements assigned to the input member that was actuated at 104 are used as the initial linguistic elements of a number of linguistic element permutations that are constructed and used during the ambiguous text input. A second input member actuation is detected, as at 116, and the linguistic elements that are assigned to the actuated input member are appended, as at 120, to each of the active linguistic element permutations. Each linguistic element permutation comprises a string of Latin letters, one Latin letter for each input member actuation, and is a letter permutation of the string of input member actuations of the ambiguous text input.

Each linguistic element permutation is then processed, as at 124, with the transformation algorithm 44 to obtain a string of language objects, i.e., pins, and corresponding strings of Chinese words comprising Standard Mandarin characters. As mentioned above, the transformation algorithm 44 can include any one or more versions of the Matching Maximum Algorithm and/or other appropriate algorithms to transform phonetic Latin inputs into words of another language, such as Chinese in the present example. It is noted that the obtained string of language objects for any given linguist element permutation would more specifically constitute the segmentation of the string of Latin letters of the linguistic element permutation into a string of pins. The resultant string of words would comprise a number of Chinese words comprising Standard Mandarin characters that correspond with the string of pins. As a general matter, the transformation algorithm 44 will generate for any given linguistic element permutation a string of Chinese words that corresponds with the obtained string of language objects, pins, and that comprises generally the smallest quantity of Chinese words. In this regard, it is reiterated that some Chinese words can comprise a plurality of pins, with each pin being represented by a standard Mandarin character. The string of words generated for any given linguistic element permutation thus would either constitute the smallest number of Chinese words that correspond with a given quantity of pins, or would comprise the string of Chinese words of a given quantity that comprise the greatest number of pins and thus standard Mandarin characters, or both.

Certain of the linguistic element permutations might be determined to be invalid and are thus ignored. That is, the aforementioned various linguistic element permutations might not comprise every possible permutation of linguistic elements of the ambiguous text input since some permutations of the linguistic elements might be invalid in the scheme of Pinyin Chinese input. For instance, if the first two input member actuations of the ambiguous text input were the key sequence <AS> <AS>, the various letter permutations at this point would be "AA", "AS", "SA", and "SS". The letter permutation "SS" would be considered to be invalid in Pinyin Chinese since "SS" could not be the initial two letters of a string of Pinyin Chinese inputs. That is, no pin corresponds with "SS" or "S", and no pin begins with "SS". As such, the linguistic element permutation beginning with "SS" would be ignored upon the second input member actuation, and with further input member actuations no larger linguistic element permutation would be constructed upon the "SS" linguistic element permutation. A linguist element permutation that is being constructed can at any time be determined to be invalid, and is thus ignored, if a portion of the linguistic element permutation is determined to be invalid, such as if the linguistic element permutation was determined to comprise the Latin letters "DDD", which could not be validity resolved into Chinese pins. Such ignoring of invalid linguistic element permutation advantageously reduces processor effort by ignoring linguistic possibilities that are incapable of resulting in a valid character interpretation.

The determination of invalidity typically occurs through the use of the transformation algorithm 44. As such, once each of the existing linguistic element permutations is processed, as at 124, with the transformation algorithm 44, any of the linguist element permutations that are determined by the transformation algorithm 44 to be invalid are discarded, as at 128.

In accordance with the disclosed and claimed concept, the transformation algorithm 44 then compares the strings of words of the various linguistic element permutations, as were generated at 124, and identifies, as at 132, the linguist element permutation or permutations having the fewest quantity of words in its string of words. That is, the transformation algorithm 44 identifies at 132 the linguistic element permutation for which the quantity of Chinese words in the generated string of words is less than the quantities of words in the other strings of words that were generated for the other linguist element permutations. It is possible, however, that a plurality of linguistic element permutation have the same smallest quantity of Chinese words in their strings of words. It is therefore determined, as at 136, whether the transformation algorithm 44 identified a plurality of linguistic element permutations as each having the fewest words.

If it is determined at 136 that only one such linguistic element permutation was identified as having the fewest words, processing continues, as at 140, where an output is generated and is displayed at the text input component 46 and the lookup component 48. Specifically, at 140 the GUI 44 outputs at the text input component 46 the segmented string of language objects, i.e., pins of the identified linguistic element permutation. Additionally, the GUI 44 outputs in a lookup window at the lookup component 48 a default pin 60 which, in the exemplary embodiment depicted herein, is the terminal pin of the sequence of pins that was output at the text input component 46. The default pin 60, as well as one or more variant pins 64, if they exist, are output at the pin region 52 of the lookup component 48. Additionally, the GUI 44 outputs at the text region 56 of the lookup window at the lookup component 48 a default character interpretation 68 that comprises one or more Chinese words comprising Standard Mandarin characters, and further outputs one or more variant character interpretations 72, to the extent that they might exist. An exemplary output is shown in FIG. 4 and will be described in greater detail below.

If, on the other hand, it was determined at 136 that a plurality of linguistic elements were identified as having the fewest Chinese words, processing continues as at 144 where, for each such linguistic element permutation, the transformation algorithm 44 obtains frequency data associated with each of the words of the character interpretation of the linguistic element permutation. Such frequency data is already stored, for example, in the dictionary 42. As mentioned above, the dictionary 42 comprises a plurality of words which, in the present exemplary embodiment, are Chinese words that each comprise one or more Standard Mandarin characters. The dictionary 42 additionally includes a number of frequency objects each having a frequency value. Each word in the dictionary 42 has associated therewith one of the frequency objects. The frequency value of the associated frequency object is reflective of the relative frequency of use of the Chinese word within the Chinese language.

At 144, therefore, the transformation algorithm 44 obtains from the dictionary 42 the frequency values of the frequency objects associated with the words in the string of words, sums the frequency values, and attributes the frequency value sum to the particular linguistic element permutation. The frequency value sums of the various linguistic element permutations are then compared with one another, and the transformation algorithm identifies, as at 148, the linguistic element permutation having attributed thereto the greatest frequency value sum. As such, it can be seen that the result at 148 is an identification of the linguistic element permutation having both a smallest quantity of Chinese words and having a greatest overall frequency value when compared with other linguistic element permutations having the same fewest quantity of Chinese words. Processing thereafter continues, as at 140, where the linguistic element permutation identified at 148 is output in the text input component 46 and a corresponding lookup component 48 is generated and is similarly output.

Once the output is generated, as at 140, processing continues, as at 116, where an additional input member actuation is detected. In such a fashion, any linguistic element permutation that has not been discarded is gradually built up with the various linguistic elements of each input member as the input member is actuated. For example, if eight linguistic element permutations were remaining at the time of an actuation of an input member such as the key 28 <BN>, the transformation algorithm 44 would generate sixteen linguistic element permutations. That is, all eight of the remaining linguistic element permutations would separately have the letters "B" and "N" appended thereto for a total of sixteen new linguistic element permutations. All sixteen of the new linguistic element permutations, for example, would therefore be subjected, as at 124, to the transformation algorithm 44 to generate a segmented string of language objects and a corresponding string of Chinese words. Any of the linguistic element permutations that are determined to be invalid would be ignored, as at 128.

Exemplary outputs of an exemplary text input operation are depicted generally in FIGS. 4-9. FIG. 4 depicts an exemplary output in response to the ambiguous text input <DF> <AS> <JK> <UI> <AS®. In response thereto, the transformation algorithm 44 and the GUI 44 have output at the text component 46 the pin string "DA'JIA", which comprises the two pins "DA" and "JIA", with the segmentation between the two pins being indicated by an apostrophe. It can be seen that the terminal pin "JIA" of the string of language objects, i.e., pins, output at the text input component 46 is likewise output as a default pin 60 in the pin region 52 of the lookup component 48. Also listed in the pin region 52 are a plurality of variant pins 64 comprising the pins "JU", "JUA", "JI", "KUA", and "KU". Back in the text input component 46, the pin "JIA" within the sequence of pins has an indicator 284 applied thereto, which indicates that the pin "JIA" of the text input component 46 is the subject of the pin region 52 of the lookup component 48. In the pin region 52 itself, the default pin 60 has a highlight 288 applied thereto, which indicates that the default pin 60 is the subject of a selection focus of the processor apparatus 16, and which means that inputs received such as via the track ball 32 or otherwise will be interpreted by the processor apparatus 16 with respect to the default pin 60.

For example, if the pin to which the highlight 288 is applied, i.e., in FIG. 4 the default pin 60, the pin will be finalized, i.e., it will be deemed to have been affirmatively selected by the user. In response, the output changes to be that depicted generally in FIG. 5. Specifically, the highlight 288 is applied to the default character interpretation 68, and the indicator 284 indicates the entire pin string "DA'JIA". Since the indicator 284 indicates the subject matter of the lookup component 48, the application of the indicator 284 to the entire pin string in the text input component 46 indicates to the user that the entire pin string corresponds with the displayed object in the lookup component 48 that is the subject of the highlight 288 in FIG. 5, i.e., the default character interpretation 68.

Since the default character interpretation 68 is the subject of the highlight 288, the default character interpretation 68 can be finalized, i.e., affirmatively selected by the user, by the user translating, i.e., pressing or clicking, the track ball 32, by actuating an <ENTER> key, or by providing some other predetermined input. In the event that the user selects the default character interpretation 68 of FIG. 5, the output will change to that of FIG. 6 where the lookup component 48 has been removed and wherein the string of pins that had been output at the text input component 46 and to which corresponded the default character interpretation 68 are replaced with the default character interpretations 68.

With reference back to FIG. 5, it can be seen that when the default character interpretation 68 is the subject of the highlight 288, the pin region 52 of the lookup component 48 provides as a default pin 60 the pin "DA" and as a variant pin 64 the pin "FA". Since the default character interpretation 68 is the subject of the highlight 288 and thus can be finalized by the user clicking the track ball, the pin region 52 provides to a user at this point an opportunity to perform an editing operation. Specifically, it can be seen that the default pin 60 "DA" is also the first, i.e., leftmost, pin in the pin sequence in the text lookup component 46. As was seen in FIG. 4, during the typing of linguistic input members the pin region 52 of the lookup component 48 typically provides as the default and variant pins 60 and 64 the current pin being entered, i.e., the terminal pin, and variants thereof. However, and as can be seen in FIG. 5, when a character interpretation is the subject of the highlight 288 and thus is capable of being finalized by the user, the system advantageously outputs the initial pin of the pin sequence of the text input component 46 in order to allow it to be edited.

For instance, and from the output depicted generally in FIG. 5, if the user entered an upward scrolling input, i.e., an upward movement input with the track ball 32, the default pin 60 "DA" would become the subject of the highlight 288 and thus the selection focus of the processor apparatus 16. An affirmative selection of the default pin 60 would not change the contents of the text region 56 of the lookup component 48 since the text region 56 already displays character interpretations of the pin sequence "DA'JIA", and a selection of the default pin 60 "DA" would not change the pin sequence or the character interpretation thereof. However, if the user entered a scrolling input in a rightward direction, i.e., a movement input to the right with the track ball 32, the variant pin 64 "FA" would become the subject of the highlight 288, which could result in the contents of the text region 56 being updated and changed to reflect a selection of the variant pin 64 "FA" as the initial pin of the pin string at the text input location 46.

If at FIG. 4 the user had entered a scrolling input the rightward direction, the output would be as depicted generally in FIG. 7. Specifically, since in FIG. 4 the highlight 288 and thus the selection focus are applied to the default pin 60 "JIA", a single rightward scroll with the track ball 32 would cause the variant pin 64 "JU" to be the subject of the highlight 288 and the selection focus. In this regard, it can be seen that not all of the variant pins 64 have the same number of characters as the default pin 60, i.e., the default pin 60 "JIA" has three characters while some of the variant pins 64 have three characters and others have two characters. This reflects the ambiguity inherent in the current input method. The linguistic element permutations that were generated and which resulted in the pin sequence that is output at the text input component 46 also indicate that the final three input member actuations could refer to the relatively shorter pin "JU" followed by the character "A" which could be its own individual pin or could be the initial letter of a longer pin. Since in FIG. 7 the variant pin 64 "JU" is the subject of the highlight 288, the indicator 284 in FIG. 7 indicates the same characters "JU" in the text input component 46 as being the subject of the lookup component 48.

As can further be seen in FIG. 7, the rightward scrolling input from the track ball 32 has not only made the variant pin 64 "JU" the subject of the selection focus, but has also caused the text region 56 of the lookup component 48 to be changed to reflect the preliminarily changed pin sequence. That is, in FIG. 4 the pin sequence that was output at the text input component 46 was "DA'JIA", i.e., the pin "DA" followed by the pin "JIA". In FIG. 7, the rightward scroll with the track ball 32 has caused the variant pin 64 "JU" to be the subject of the highlight 288 and the selection focus, and has also resulted in the pin sequence that is output at the text input component 46 to be changed at least preliminarily to the pin "DA" followed by the pin "JU" followed either the pin "A" or a pin that begins with the letter "A".

If at FIG. 7 the user affirmatively selected the pin "JU" that is the subject of the highlight 288, the output will change to be that of FIG. 8. Specifically, the initial portion of the output at the text input component 46 is the subject of the indicator 284, i.e., the pin sequence "DA'JU", i.e., the pin "DA" followed by the pin "JU". The default character interpretation in FIG. 8 is the subject of the highlight 288 and thus the selection focus.

If in FIG. 8 the user affirmatively selected the default character interpretation 68, such as by actuating or clicking the track ball 32, the output would be as depicted generally in FIG. 9. Specifically, the portion of the pin sequence at the text input component 46 in FIG. 8 that is the subject of the indicator 284 would be replaced with the default character interpretation 68 of FIG. 8, thus forming in the text input component 46 the word portion 76 comprising what had been the default character interpretation 68 and a pin portion 80 comprising the letter "A" which is itself a pin as is indicated by the default and variant character interpretations 68 an 72 in the text region 56. FIG. 9 depicts the default pin 60 "A" as being the subject of the highlight 288. If the user either actuated the track ball 32 or entered a scrolling input in a downward direction with the track ball 32, the single-character default character interpretation 68 would be the subject of the highlight 288. A click of the track ball 32 would affirmatively select the default character interpretation 68 and would output it in the text input component 46 in place of the pin "A" that is the subject of the indicator 284 and that is the pin portion 80.

It can be understood that all of the objects that are displayed in the lookup component 48 are selectable objects that are capable of being affirmatively selected by the user through the use of actuations, i.e., translations, of the track ball 32 and/or scrolling inputs, i.e., movement inputs or navigational inputs, from the track ball 32. While the transformation algorithm 44 generates and outputs what is proposed to the user to be the best interpretation of an ambiguous Latin character text input, the pin region 52 and the text region 56 of the lookup component 48 together advantageously enable the user to select alternate pins and/or to select alternate character interpretations in one location with the use of a single input member, the multiple-axis track ball 32.

Additional benefits are provided by the multiple-axis input device. For instance, an exemplary home screen output that can be visually output on the display 18 is depicted in FIG. 10 as including a plurality of icons 1062 that are selectable by the user for the purpose of, for example, initiating the execution on the processor apparatus 16 of a routine 44 that is represented by an icon 1062. The track ball 32 is rotatable to provide, for example, navigational inputs among the icons 1062.

For example, FIG. 10 depicts the travel of an indicator 1066 from the icon 1062A, as is indicated in broken lines with the indicator 1066A, to the icon 1062B, as is indicated in broken lines with the indicator 1066B, and onward to the icon 1062C, as is indicated by the indicator 1066C. It is understood that the indicators 1066A, 1066B, and 1066C are not necessarily intended to be simultaneously depicted on the display 18, but rather are intended to together depict a series of situations and to indicate movement of the indicator 1066 among the icons 1062. The particular location of the indicator 1066 at any given time indicates to a user the particular icon 1062, for example, that is the subject of a selection focus of the handheld electronic device 4. Whenever an icon 1062 or other selectable object is the subject of the selection focus, a selection input to the processor apparatus 16 will result in execution or initiation of the routine 44 or other function that is represented by the icon 1062 or other selectable object.

The movement of the indicator 1066 from the icon 1062A, as indicated with the indicator 1066A, to the icon 1062B, as is indicated by the indicator 1066B, was accomplished by rotating the track ball 32 about the vertical axis 34B to provide a horizontal navigational input. As mentioned above, a rotation of the track ball 32 a predetermined rotational distance results in an input to the processor apparatus 16. In the present example, the track ball 32 would have been rotated about the vertical axis 34B a rotational distance equal to three times the predetermined rotational distance since the icon 62B is disposed three icons 1062 to the right the icon 1062A. Such rotation of the track ball 32 likely would have been made in a single motion by the user, but this need not necessarily be the case.

Similarly, the movement of the indicator 1066 from the icon 1062B, as indicated by the indicator 1066B, to the icon 1062C, as is indicated by the indicator 1066C, was accomplished by the user rotating the track ball 32 about the horizontal axis 34A to provide a vertical navigational input. In so doing, the track ball 32 would have been rotated a rotational distance equal to two times the predetermined rotational distance since the icon 1062C is disposed two icons 1062 below the icon 1062B. Such rotation of the track ball 32 likely would have been made in a single motion by the user, but this need not necessarily be the case.

It thus can be seen that the track ball 32 is rotatable in various directions to provide various navigational and other inputs to the processor apparatus 16. Rotational inputs by the track ball 32 typically are interpreted by whichever routine 44 is active on the handheld electronic device 4 as inputs that can be employed by such routine 44. For example, the GUI 44 that is active on the handheld electronic device 4 in FIG. 10 requires vertical and horizontal navigational inputs to move the indicator 1066, and thus the selection focus, among the icons 1062. If a user rotated the track ball 32 about an axis oblique to the horizontal axis 34A and the vertical axis 34B, the GUI 44 likely would resolve such an oblique rotation of the track ball 32 into vertical and horizontal components which could then be interpreted by the GUI 44 as vertical and horizontal navigational movements, respectively. In such a situation, if one of the resolved vertical and horizontal navigational movements is of a greater magnitude than the other, the resolved navigational movement having the greater magnitude would be employed by the GUI 44 as a navigational input in that direction to move the indicator 1066 and the selection focus, and the other resolved navigational movement would be ignored by the GUI 44, for example.

When the indicator 1066 is disposed on the icon 1062C, as is indicated by the indicator 1066C, the selection focus of the handheld electronic device 4 is on the icon 1062C. As such, a translation of the track ball 32 toward the housing 6 as described above would provide an input to the processor apparatus 16 that would be interpreted by the GUI 44 as a selection input with respect to the icon 1062C. In response to such a selection input, the processor apparatus 16 would, for example, begin to execute a routine 44 that is represented by the icon 1062C. It thus can be understood that the track ball 32 is rotatable to provide navigational and other inputs in multiple directions, assuming that the routine 44 that is currently active on the handheld electronic device 4 can employ such navigational or other inputs in a plurality of directions, and can also be translated to provide a selection input or other input.

Figure 11:
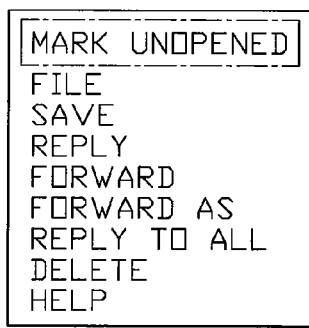
FIG. 11 depicts an exemplary menu that can be output on the handheld electronic device of FIG. 1.
Figure 12:
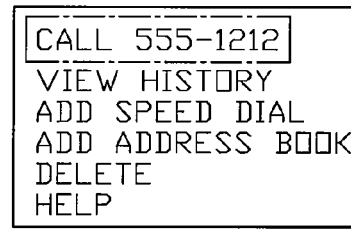
FIG. 12 depicts another exemplary menu.

As mentioned above, FIG. 11 depicts an exemplary menu 1035A that would be appropriate if the user's current logical location within the logical menu tree was viewing an email within an email routine 44. That is, the menu 1035A provides selectable options that would be appropriate for a user given that the user is, for example, viewing an email within an email routine 44. In a similar fashion, FIG. 12 depicts another exemplary menu 1035B that would be depicted if the user's current logical location within the logical menu tree was within a telephone routine 44.

Rotational movement inputs from the track ball 32 could be employed to navigate among, for example, the menus 1035A and 1035B. For instance, after an actuation of the <MENU> key 33 and an outputting by the GUI 44 of a resultant menu, the user could rotate the track ball 32 to provide scrolling inputs to successively highlight the various selectable options within the menu. Once the desired selectable option is highlighted, i.e., is the subject of the selection focus, the user could translate the track ball 32 toward the housing 6 to provide a selection input as to the highlighted selectable option. In this regard, it is noted that the <MENU> key 33 is advantageously disposed adjacent the track ball 32. This enables, for instance, the generation of a menu by an actuation the <MENU> key 33, conveniently followed by a rotation the track ball 32 to highlight a desired selectable option, for instance, followed by a translation of the track ball 32 toward the housing 6 to provide a selection input to initiate the operation represented by the highlighted selectable option.

It is further noted that one of the additional inputs that can be provided by a translation of the track ball 32 is an input that causes the GUI 44 to output a reduced menu. For instance, a translation of the track ball 32 toward the housing 6 could result in the generation and output of a more limited version of a menu than would have been generated if the <MENU> key 33 had instead been actuated. Such a reduced menu would therefore be appropriate to the user's current logical location within the logical menu tree and would provide those selectable options which the user would have a high likelihood of selecting. Rotational movements of the track ball 32 could provide scrolling inputs to scroll among the selectable options within the reduced menu 1035C, and translation movements of the track ball 32 could provide selection inputs to initiate whatever function is represented by the selectable option within the reduce menu 1035C that is currently highlighted.

Figure 13:
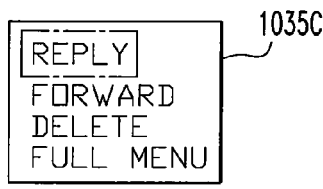
FIG. 13 depicts an exemplary reduced menu.

By way of example, if instead of actuating the <MENU> key 33 to generate the menu 1035A the user translated the track ball 32, the GUI 44 would generate and output on the display the reduced menu 1035C that is depicted generally in FIG. 13. The exemplary reduced menu 1035C provides as selectable options a number of the selectable options from the menu 1035A that the user would be most likely to select. As such, a user seeking to perform a relatively routine function could, instead of actuating the <MENU> key 33 to display the full menu 1035A, translate the track ball 32 to generate and output the reduced menu 1035C. The user could then conveniently rotate the track ball 32 to provide scrolling inputs to highlight a desired selectable option, and could then translate the track ball 32 to provide a selection input which would initiate the function represented by the selectable option in the reduced menu 1035C that is currently highlighted.

In the present exemplary embodiment, many of the menus that could be generated as a result of an actuation of the <MENU> key 33 could instead be generated and output in reduced form as a reduced menu in response to a translation of the track ball 32 toward the housing 6. It is noted, however, that a reduced menu might not be available for each full menu that could be generated from an actuation of the <MENU> key 33. Depending upon the user's specific logical location within the logical menu tree, a translation of the track ball 32 might be interpreted as a selection input rather than an input seeking a reduced menu. For instance, a translation of the track ball 32 on the home screen depicted in FIG. 1 would result in a selection input as to whichever of the icons 1062 is the subject of the input focus. If the <MENU> key 33 was actuated on the home screen, the GUI 44 would output a menu appropriate to the home screen, such as a full menu of all of the functions that are available on the handheld electronic device 4, including those that might not be represented by icons 1062 on the home screen.

Figure 14:
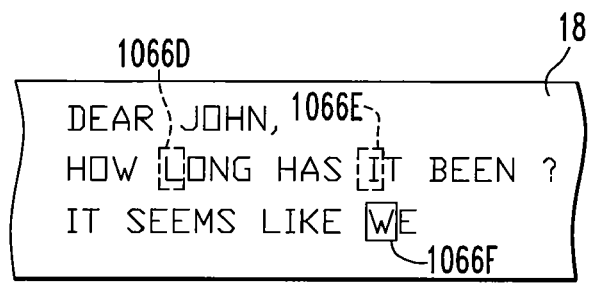
FIG. 14 is an output such as could occur during another exemplary text entry or text editing operation.

FIG. 14 depicts a quantity of text that is output on the display 18, such as during a text entry operation or during a text editing operation, for example. The indicator 1066 is depicted in FIG. 14 as being initially over the letter "L", as is indicated with the indicator 1066D, and having been moved horizontally to the letter "I", as is indicated by the indicator 1066E, and thereafter vertically moved to the letter "W", as is indicated by the indicator 1066F. In a fashion similar to that in FIG. 10, the cursor 1066 was moved among the letters "L", "I", and "W" through the use of horizontal and vertical navigational inputs resulting from rotations of the track ball 32. In the example of FIG. 14, however, each rotation of the track ball 32 the predetermined rotational distance would move the indicator 1066 to the next adjacent letter. As such, in moving the indicator 1066 between the letters "L" and "I," the user would have rotated the track ball 32 about the vertical axis 1034B a rotational distance equal to nine times the predetermined rotational distance, for example, since "I" is disposed nine letters to the right of "L".

Figure 15:
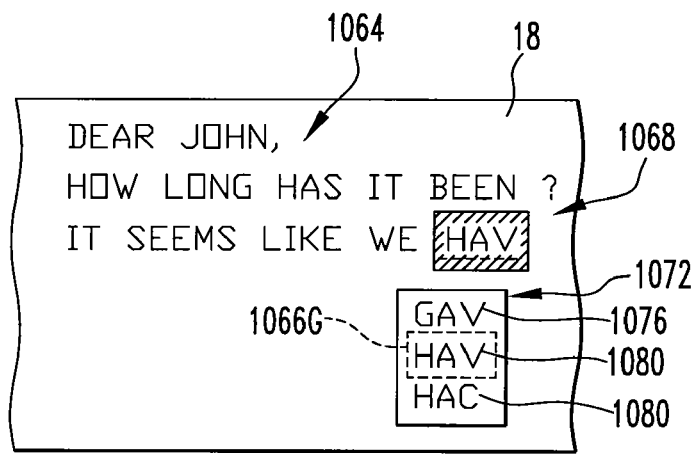
FIG. 15 is an output during another exemplary text entry operation.

FIG. 15 depicts an output 1064 on the display 18 during, for example, a text entry operation that employs the disambiguation routine 44. The output 1064 can be said to comprise a text component 1068 and a variant component 1072. The variant component 1072 comprises a default portion 1076 and a variant portion 1080. FIG. 15 depicts the indicator 1066G on the variant 1080 "HAV", such as would result from a rotation of the track ball 32 about the horizontal axis 34A to provide a downward vertical scrolling input. In this regard, it is understood that a rotation of the track ball 32 a distance equal to the predetermined rotational distance would have moved the indicator 1066 from a position (not expressly depicted herein) disposed on the default portion 1076 to the position disposed on the first variant 1080, as is depicted in FIG. 15. Since such a rotation of the track ball 32 resulted in the first variant 1080 "HAV" being highlighted with the indicator 1066G, the text component 1068 likewise includes the text "HAV" immediately preceding a cursor 1084A.

Figure 16:
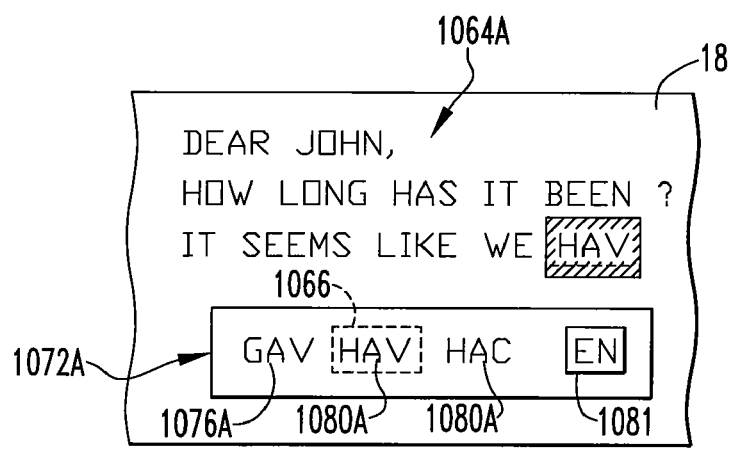
FIG. 16 is an alternative output during the exemplary text entry operation of FIG. 15.

FIG. 16 depict an alternative output 1064A having an alternative variant component 1072A having a default portion 1076A and a variant portion 1080A. The variant component 1072A is horizontally arranged, meaning that the default portion 1076A and the variants 1080A are disposed horizontally adjacent one another and can be sequentially selected by the user through the use of horizontal scrolling inputs, such as by the user rotating the track ball 32 the predetermined rotational distance about the vertical axis 34B. This is to be contrasted with the variant component 1072 of FIG. 15 wherein the default portion 1076 and the variants 1080 are vertically arranged, and which can be sequentially selected by the user through the user of vertical scrolling inputs with the track ball 32.

In this regard, it can be understood that the track ball 32 can provide both the vertical scrolling inputs employed in conjunction with the output 1064 as well as the horizontal scrolling inputs employed in conjunction with the output 1064A. For instance, the disambiguation routine 44 potentially could allow the user to customize the operation thereof by electing between the vertically arranged variant component 1072 and the horizontally arranged variant component 1072A. The track ball 32 can provide scrolling inputs in the vertical direction and/or the horizontal direction, as needed, and thus is operable to provide appropriate scrolling inputs regardless of whether the user chooses the variant component 1072 or the variant component 1072A. That is, the track ball 32 can be rotated about the horizontal axis 34A to provide the vertical scrolling inputs employed in conjunction with the variant component 1072, and also can be rotated about the vertical axis 34B to provide the horizontal scrolling inputs that are employed in conjunction with the variant component 1064A. The track ball 32 thus could provide appropriate navigational, strolling, selection, and other inputs depending upon the needs of the routine 44 active at any time on the handheld electronic device 4. The track ball 32 enables such navigational, strolling, selection, and other inputs to be intuitively generated by the user through rotations of the track ball 32 in directions appropriate to the active routine 44, such as might be indicated on the display 18.

It can further be seen from FIG. 16 that the variant component 1072A additionally includes a value 1081 that is indicative of the language into which the disambiguation routine 44 will interpret ambiguous text input. In the example depicted in FIG. 16, the language is English.

Figure 17:
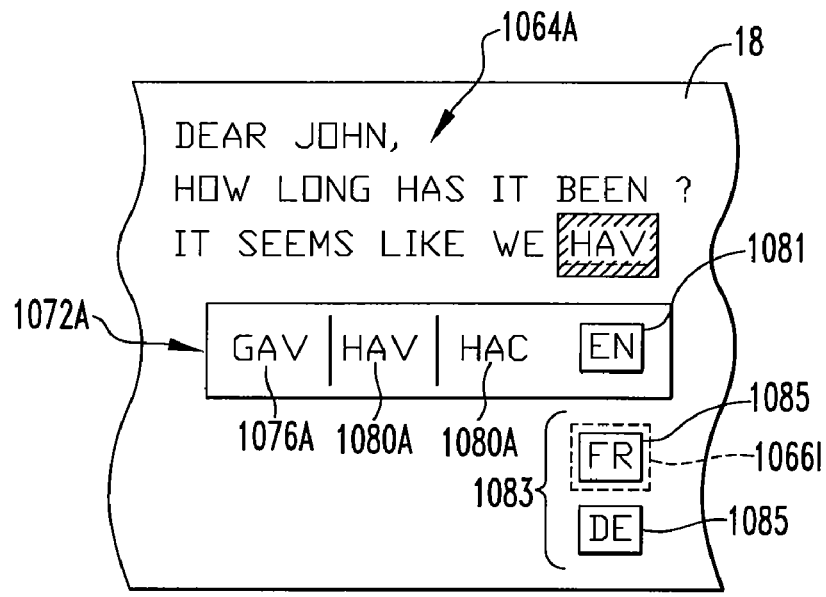
FIG. 17 is another output during another part of the exemplary text entry operation of FIG. 15.

As can be seen in FIG. 17, the value 1081 can be selected by the user to cause the displaying of a list 1083 of alternative values 1085. The alternative values 1085 are indicative of selectable alternative languages into which the disambiguation routine 44 can interpret ambiguous input. A selection of the value 1081 would have been achieved, for example, by the user providing horizontal scrolling inputs with the track ball 32 to cause (not expressly depicted herein) the indicator 1066 to be disposed over the value 1081, and by thereafter translating the track ball 32 toward the housing 6 to provide a selection input.

The alternative values 1085 in the list 1083 are vertically arranged with respect to one another and with respect to the value 1081. As such, a vertical scrolling input with the track ball 32 can result in a vertical movement of the indicator 10661 to a position on one of the alternative values 1085 which, in the present example, is the alternative value 1085 "FR", which is representative of the French language. The alternative value 1085 "FR" could become selected by the user in any of a variety of fashions, such as by actuating the track ball 32 again, by continuing to enter text, or in other fashions. It thus can be understood from FIG. 16 and FIG. 17 that the track ball 32 can be rotated to provide horizontal scrolling inputs and, when appropriate, to additionally provide vertical scrolling inputs and, when appropriate, to additionally provide selection inputs, for example.

Figure 18:
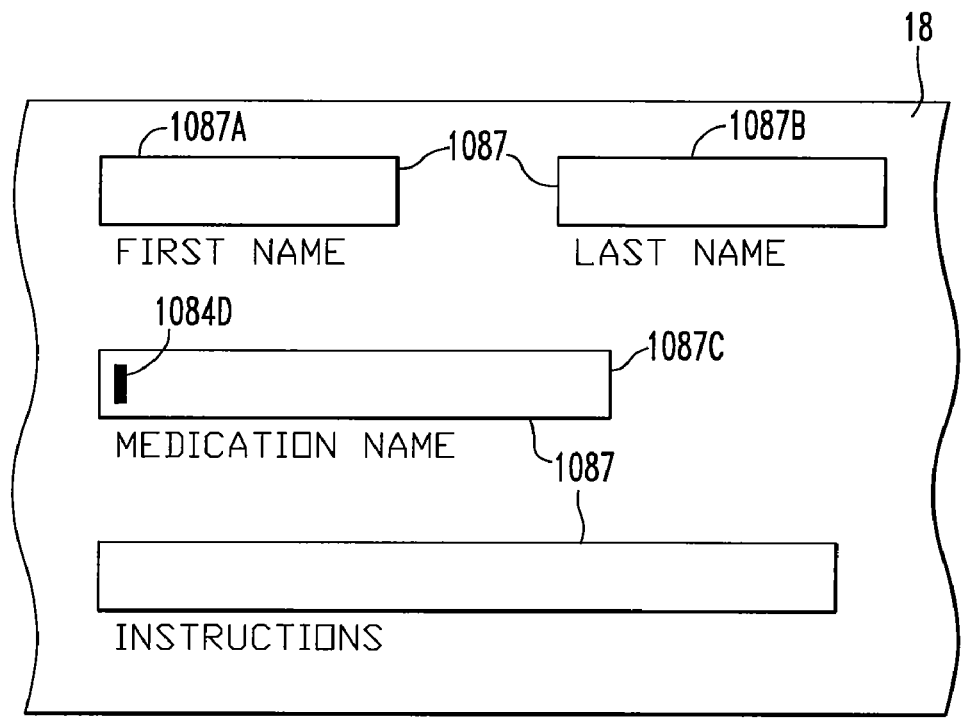
FIG. 18 is an exemplary output during a data entry operation.

FIG. 18 depicts another exemplary output on the display 18 such as might be employed by a data entry routine 44. The exemplary output of FIG. 18 comprises a plurality of input fields 1087 with corresponding descriptions. A cursor 1084D, when disposed within one of the input fields 1087, indicates to the user that an input focus of the handheld electronic device 4 is on that input field 1087. That is, data such as text, numbers, symbols, and the like, will be entered into whichever input field 1087 is active, i.e., is the subject of the input focus. It is understood that the handheld electronic device 4 might perform other operations or take other actions depending upon which input field 1087 is the subject of the input focus.

Navigational inputs from the track ball 32 advantageously enable the cursor 1084D, and thus the input focus, to be switched, i.e., shifted, among the various input fields 1087. For example, the input fields 1087 could include the input fields 1087A, 1087B, and 1087C. FIG. 18 depicts the cursor 1084D as being disposed in the input field 1087C, indicating that the input field 1087C is the subject of the input focus of the handheld electronic device 4. It is understood that the cursor 1084D, and thus the input focus, can be shifted from the input field 1087C to the input field 1087A, which is disposed adjacent and vertically above the input field 1087C, by providing a vertical scrolling input in the upward direction with the track ball 32. That is, the track ball 32 would be rotated the predetermined rotational distance about the horizontal axis 34. Similarly, the cursor 1084D, and thus the input focus, can be shifted from the input field 1087A to the input field 1087B, which is disposed adjacent and to the right of the input field 1087A, by providing a horizontal scrolling input to the right with the track ball 32. That is, such a horizontal scrolling input could be provided by rotating the track ball the predetermined rotational distance about the vertical axis 34B. It thus can be seen that the track ball 32 is rotatable in a plurality of directions about a plurality axes to provide navigational, scrolling, and other inputs in a plurality of directions among a plurality of input fields 1087. Other types of inputs and/or inputs in other applications will be apparent.

Figure 19:
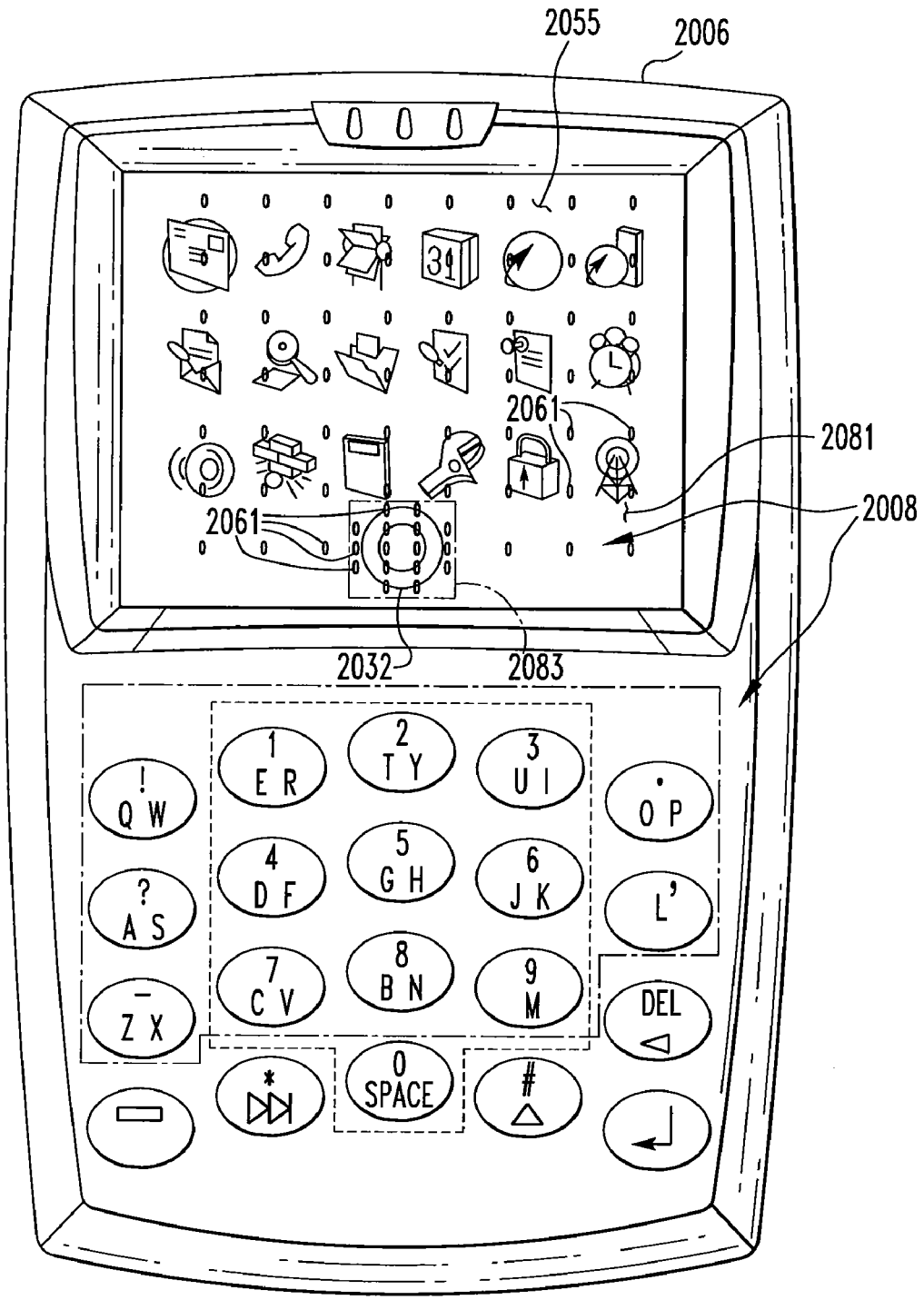
FIG. 19 is a top plan view of an improved handheld electronic device in accordance with another embodiment of the disclosed and claimed concept.
Figure 20:
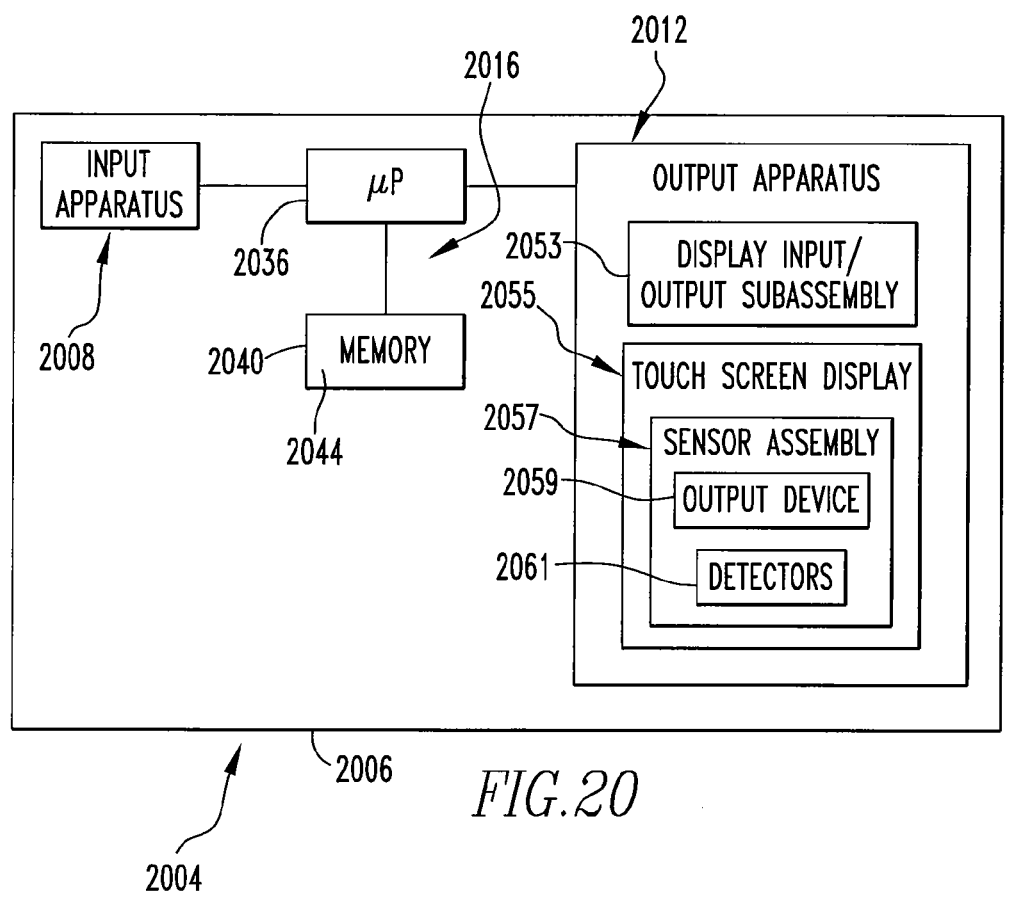
FIG. 20 is a schematic depiction of the improved handheld electronic device of FIG. 19.

An improved handheld electronic device 2004 in accordance with still another embodiment of the disclosed and claimed concept is depicted generally in FIG. 19 and FIG. 20. The handheld electronic device 2004 includes a housing 2006 upon which are disposed an input apparatus 2008, an output apparatus 2012, and a processor apparatus 2016. The processor apparatus 2016 comprises a processor 2036 a memory 2040 having stored therein a number of routines 2044. All of the operations that can be performed on or with the handheld electronic device 4 can be performed on or with the handheld electronic device 2004. As such, the features of the handheld electronic device 2004 that are common with the handheld electronic device 4, and this would comprise essentially all of the features of the handheld electronic device 4, will generally not be repeated.

As a general matter, the handheld electronic device 2004 is substantially identical in configuration and function to the handheld electronic device 4, except that the handheld electronic device 2004 includes a touch screen display 2055 that provides a non-mechanical multiple-axis input device 2032 instead of the track ball 32. The non-mechanical multiple-axis input device 2032 can be said to be in the form of a virtual track ball 2032.

As is generally understood, the touch screen display 2055 includes a liquid crystal layer between a pair of substrates, with each substrate including an electrode. The electrodes form a grid which defines the aperture size of the pixels. When a charge is applied to the electrodes, the liquid crystal molecules of the liquid crystal layer become aligned generally perpendicular to the two substrates. A display input/output subassembly 2053 of the output apparatus 2012 controls the location of the charge applied to the electrodes thereby enabling the formation of images on the touch screen display 2055.

Additionally, the touch screen display 2055 comprises a sensor assembly 2057 which comprises an output device 2059 and a plurality of detectors 2061. The detectors 2061 are shown schematically and are typically too small to be seen by the naked eye. Each detector 2061 is in electrical communication with the output device 2059 and creates an output signal when actuated. The detectors 2061 are disposed in a pattern, discussed below, and are structured to detect an external object immediately adjacent to, or touching, the touch screen display 2055. The external object is typically a stylus or a user's finger (not shown). The output device 2059 and/or the processor 2016 are structured to receive the detector signals and convert the signals to data representing the location of the external object relative to the touch screen display 2055. As such, while the sensor assembly 2057 is physically a component of the touch screen display 2055, it is nevertheless considered to be a logical component of the input apparatus 2008 since it provides input to the processor apparatus.

The detectors 2061 are typically capacitive detectors, optical detectors, resistive detectors, or mechanical detectors such as strain gauge or charged grid, although other technologies may be employed without departing from the present concept. Typically, capacitive detectors are structured to detect a change in capacitance caused by the electrical field of the external object or a change in capacitance caused by the compression of the capacitive detector. Optical detectors are structured to detect a reflection of light, e.g., light created by the touch screen display 2055. Mechanical detectors include a charged grid with columns that would be disposed on one side of the touch screen display 2055 and a corresponding grid without columns would be disposed at another location on the touch screen display 2055. In such a configuration, when the touch screen display 2055 is compressed, i.e. as a result of being touched by the user, the columns at the area of compression contact the opposing grid thereby completing a circuit.

Capacitive detectors may be disposed upon either substrate and, although small, require space. Thus, and any pixel that is disposed adjacent a detector 2061 will have a reduced size, or aperture, to accommodate the adjacent detector 2061.

The detectors 2061 are disposed in a pattern, and at least some of the detectors 2061 preferably are arranged in lines that form a grid. A first portion of the detectors 2061 are disposed on a first area 2081 of the touch screen display 2055, and a second portion of the detectors 2061 are disposed on a second area 2083 of the touch screen display 2055. As can be seen from FIG. 19, the first area 2081 essentially is every region of the touch screen display 2005 other than the second area 2083.

The first portion of the detectors 2061 disposed on the first area 2081 of the touch screen display 2055 are disposed in a relatively sparse pattern in order to minimize the visual interference that is caused by the presence of the detectors 2061 adjacent the pixels. Preferably, the spacing of the detectors 2061 on the first area 2081 is between about 1.0 mm and 10.0 mm between the detectors 2061, and more preferably about 3.0 mm between the detectors 2061.

The second portion of the detectors 2061 are disposed in a relatively dense pattern on the second area 2083 of the touch screen display 2055 and are structured to support the function of the virtual track ball 2032. The image quality in the second area 2083 of the touch screen display 2055 is adversely affected due to the dense spacing of the detectors 2061 there. However, the second area 2083 is a relatively small area compared to the entire touch screen display 2055. Preferably, the density of the detectors 2061 in the second area 2083 is between about 0.05 mm and 3.0 mm between the detectors, and more preferably about 0.1 mm between the detectors 2061. Further, because the pixels in the second area 2083 are dedicated for the virtual track ball 2032, it is acceptable to have a reduced pixel density with larger pixels. Since the pixel size would be very large, the aspect ratio would be significantly higher than that of pixels that are not disposed adjacent a detector 2061. The pixels in the second area 2083 likely would be special function pixels, such as pixels that would both depict the virtual track ball 2032 and that would light up the second area 2083 to highlight the virtual track ball 2032.

The processor apparatus is structured to create images and define the boundaries of selectable portions of the images on the touch screen display 2055. For example, the processor apparatus will create the images of selectable icons or other objects on specific portions of the touch screen display 2055. The processor apparatus is further structured to relate specific detectors 2061 to the specific portions of the touch screen display 2055. Thus, when the processor apparatus detects the actuation of a specific detector 2061 adjacent to a specific image, e.g. a selectable icon, the processor apparatus will initiate the function or routine related to that icon, e.g. opening a calendar program.

Similarly, the processor apparatus is structured to employ specific detectors 2061 to support the function of the virtual track ball 2032 in the second area 2083 of the touch screen display 2055. Thus, actuations of one or more of the detectors 2061 that support the virtual track ball 2032 will be interpreted by the processor apparatus as being inputs from the virtual track ball 2032. For instance, an actuation of a sequential plurality of detectors 2061 extending along a particular direction on the touch screen display 2055 in the second area 2083 might be interpreted as a navigational input, a scrolling input, a selection input, and/or another input in the particular direction. Since the user can freely move a finger, for instance, in any direction on the touch screen display 2055, the virtual track ball 2032 is a multiple-axis input device. Other inputs, such as a non-moving actuation of one or more detectors 2061 in the central region of the virtual track ball 2032 could be interpreted by the processor apparatus as an actuation input of the virtual track ball 2032, such as would be generated by an actuation of the track ball 32 of the handheld electronic device 1004 in a direction toward the housing 1006 thereof. It can be understood that other types of actuations of the detectors 2061 in the second area 2083 can be interpreted as various other inputs without departing from the disclosed and claimed concept.

The handheld electronic device 2004 thus comprises a multiple-axis input device 2032 that is non-mechanical but that still provides the same functional features and advantages as, say, the track ball 32 of the handheld electronic device 4. It is understood that the virtual track ball 2032 is but one example of the many types of multiple-axis input devices that could be employed on the handheld electronic device 2004.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling input on a handheld electronic device that comprises an output apparatus, an input apparatus comprising a plurality of input keys, and a processor apparatus comprising a memory having stored therein a plurality of objects that comprise a plurality of language objects, a plurality of characters, and a plurality of words, at least some of the language objects each being associated with a plurality of the characters, each word comprising a number of the characters, at least some of the input keys each having a number of linguistic elements assigned thereto, each language object comprising a number of the linguistic elements, the method comprising:
   detecting an ambiguous text input comprising a number of selections of a number of input keys;
   generating a string of language objects that corresponds with at least an initial portion of the ambiguous input;
   outputting one of the language objects of the string of language objects and at least one variant language object as an alternative to the one of the language objects of the string of language objects in a first region of the output apparatus, the one of the language objects of the string of language objects and the at least one variant language object being selectable;
   outputting a character interpretation that comprises a number of words comprising characters that correspond with at least a portion of the string of language objects in a second region of the output apparatus, the character interpretation being selectable;
   applying a selection focus to the one of the language objects of the string of language objects, the at least one variant language object, or the character interpretation; and
   in response to detecting a selection of the one of the language objects of the string of language objects or the at least one variant language object, outputting a second one of the language objects of the string of language objects and at least one second variant language object in the first region, wherein the second one of the language objects of the string of language objects comprises a different portion of the string of language objects than the one of the language objects of the string of language objects.

2. The method of claim 1, further comprising:
   detecting a selection of the at least one variant language object; and
   outputting another character interpretation that comprises a number of words comprising characters that correspond with the string of language objects as edited by the one of the language objects of the string of language objects being replaced with the at least one variant language object.

3. The method of claim 2, further comprising outputting the string of language objects at a text input location on the output apparatus and, responsive to the detecting of a selection of the at least one variant language object, replacing the string of language objects at the text input location with the string of language objects as edited by the one of the language objects of the string of language objects being replaced with the at least one variant language object.

4. The method of claim 1, further comprising outputting the string of language objects at a text input location on the output apparatus and, responsive to a selection of the character interpretation, replacing the string of language objects at the text input location with the character interpretation.

5. The method of claim 1, further comprising outputting the one of the language objects of the string of language objects, the at least one variant language object, and the character interpretation as objects that are selectable by one or more predetermined inputs.

6. The method of claim 5 wherein the input apparatus comprises a multiple-axis input device, the method further comprising:
   outputting a lookup window comprising as output components the one of the language objects of the string of language objects, the at least one variant language object, and the character interpretation;
   applying a selection focus to one of the one of the language objects of the string of language objects, the at least one variant language object, and the character interpretation; and
   detecting a navigational input and, responsive thereto, shifting the selection focus to another of the one of the language objects of the string of language objects, the at least one variant language object, and the character interpretation.

7. The method of claim 6, further comprising detecting a selection input from the multiple-axis input device and, responsive thereto, and when the navigational input had resulted in a shifting of the selection focus to the at least one variant language object, outputting another character interpretation that comprises a number of words comprising characters that correspond with the string of language objects as edited by the one of the language objects of the string of language objects being replaced with the at least one variant language object.

8. The method of claim 6, further comprising detecting a selection input from the multiple-axis input device and, responsive thereto, and when the navigational input had resulted in a shifting of the selection focus to the character interpretation, outputting the character interpretation at a text input location on the output apparatus.

9. The method of claim 5, further comprising outputting as the character interpretation a default character interpretation and at least one variant character interpretation as an alternative to at least a portion of the default character interpretation.

10. The method of claim 9, further comprising outputting the string of language objects at a text input location on the output apparatus and, responsive to a selection of the at least one variant character interpretation, outputting the at least one variant character interpretation at the text input location in place of whatever portion of the string of language objects with which the at least one variant character interpretation corresponds.

11. The method of claim 1, further comprising:
   outputting the string of language objects at a text input location on the output apparatus; and
   outputting a lookup window comprising a first portion and a second portion, the one of the language objects of the string of language objects and the at least one variant language object being output in the first portion, and the character interpretation being output in the second portion.

12. The method of claim 11, further comprising, responsive to the ambiguous text input, applying a selection focus to the lookup window.

13. The method of claim 11, further comprising outputting as the character interpretation in the second portion a default character interpretation and at least one variant character interpretation as an alternative to at least a portion of the default character interpretation.

14. The method of claim 1, further comprising detecting as the ambiguous text input an ambiguous text input in Latin letters, and outputting as the character interpretation a number of words comprising at least one of Chinese characters, Japanese characters, and Korean characters.

15. A handheld electronic device comprising:
   a processor apparatus comprising a processor and a memory having a plurality of objects stored therein;
   an input apparatus comprising a plurality of input keys and being structured to provide input to the processor apparatus;
   an output apparatus structured to receive output signals from the processor apparatus;
   at least some of the input keys each having a number of linguistic elements assigned thereto;
   the plurality of objects comprising a plurality of language objects, a plurality of characters, and a plurality of words, at least some of the language objects each being associated with a plurality of the characters, each word comprising a number of the characters, each language object comprising a number of the linguistic elements;
   the memory further having stored therein a number of routines which, when executed on the processor, cause the handheld electronic device to perform operations comprising:
   detecting an ambiguous text input comprising a number of selections of a number of input keys, at least some of the number of input keys each having as the number of linguistic elements assigned thereto a plurality of linguistic elements assigned thereto;
   generating a string of language objects that corresponds with at least an initial portion of the ambiguous input;
   outputting one of the language objects of the string of language objects and at least one variant language object as an alternative to the one of the language objects of the string of language objects in a first region of the output apparatus, the one of the language objects of the string of language objects and the at least one variant language object being selectable;
   outputting a character interpretation that comprises a number of words comprising characters that correspond with at least a portion of the string of language objects in a second region of the output apparatus, the character interpretation being selectable;
   applying a selection focus to the one of the language objects of the string of language objects, the at least one variant language object, or the character interpretation; and
   in response to detecting a selection of the one of the language objects of the string of language objects or the at least one variant language object, outputting a second one of the language objects of the string of language objects and at least one second variant language object in the first region, wherein the second one of the language objects of the string of language objects comprises a different portion of the string of language objects than the one of the language objects of the string of language objects.

16. The handheld electronic device of claim 15 wherein the operations further comprise:
   detecting a selection of the at least one variant language object; and
   outputting another character interpretation that comprises a number of words comprising characters that correspond with the string of language objects as edited by the one of the language objects of the string of language objects being replaced with the at least one variant language object.

17. The handheld electronic device of claim 16 wherein the operations further comprise outputting the string of language objects at a text input location on the output apparatus and, responsive to the detecting of a selection of the at least one variant language object, replacing the string of language objects at the text input location with the string of language objects as edited by the one of the language objects of the string of language objects being replaced with the at least one variant language object.

18. The handheld electronic device of claim 15 wherein the operations further comprise outputting the one of the language objects of the string of language objects, the at least one variant language object, and the character interpretation as objects that are selectable by one or more predetermined inputs.

19. The handheld electronic device of claim 18 wherein the input apparatus comprises a multiple-axis input device, and wherein the operations further comprise:
   outputting a lookup window comprising as output components the one of the language objects of the string of language objects, the at least one variant language object, and the character interpretation;
   applying a selection focus to one of the one of the language objects of the string of language objects, the at least one variant language object, and the character interpretation; and
   detecting a navigational input and, responsive thereto, shifting the selection focus to another of the one of the language objects of the string of language objects, the at least one variant language object, and the character interpretation.

20. The handheld electronic device of claim 18 wherein the operations further comprise outputting as the character interpretation a default character interpretation and at least one variant character interpretation as an alternative to at least a portion of the default character interpretation.

21. The handheld electronic device of claim 15 wherein the operations further comprise:
   outputting the string of language objects at a text input location on the output apparatus; and
   outputting a lookup window comprising a first portion and a second portion, the one of the language objects of the string of language objects and the at least one variant language object being output in the first portion, and the character interpretation being output in the second portion.

* * * * *

UNITED STATES PATENT AND TRADEMARK OFFICE
CERTIFICATE OF CORRECTION

| | |
|---|---|
| PATENT NO. | : 8,365,071 B2 |
| APPLICATION NO. | : 12/046698 |
| DATED | : January 29, 2013 |
| INVENTOR(S) | : Vadim Fux et al. |

It is certified that error appears in the above-identified patent and that said Letters Patent is hereby corrected as shown below:

On the Title Page, insert the following:

Related U.S. Application Data

--(60) Provisional Application No. 60/969,393, filed on Aug. 31, 2007.--.

Figure 3B:
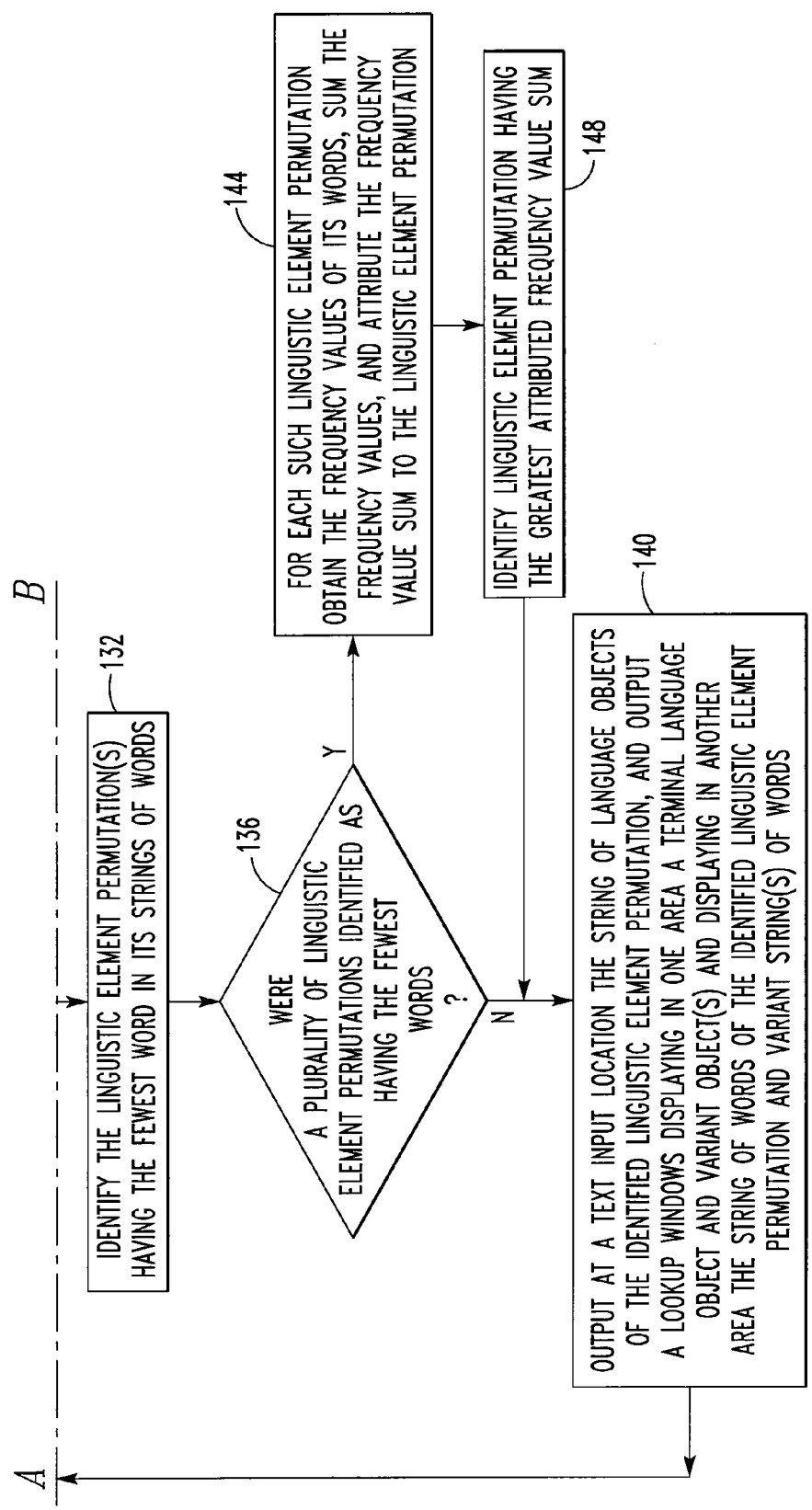

In the Drawings:

In FIG. 3B, block 132, line 2, "THE FEWEST WORD" should read --THE FEWEST WORDS--.

In FIG. 3B, block 140, line 3, "A LOOKUP WINDOWS" should read --A LOOKUP WINDOW--.

In the Specification:

In column 1, line 60, "difficulty exits in determining" should read --difficulty exists in determining--.

In column 7, line 25, "linguist element" should read --linguistic element--.

In column 7, line 63, "linguist element" should read --linguistic element--.

In column 8, line 10, "linguist element" should read --linguistic element--.

In column 8, line 17, "linguist element" should read --linguistic element--.

Signed and Sealed this
Ninth Day of April, 2013

Teresa Stanek Rea
*Acting Director of the United States Patent and Trademark Office*

In column 8, lines 23-24, "linguist element" should read --linguistic element--.

In column 8, lines 24-25, "plurality of linguistic element permutation" should read --plurality of linguistic element permutations--.

In column 9, lines 40-41, "<DF><AS><JK><UI><AS®>." should read --<DF><AS><JK><UI><AS>.--.

In column 10, line 30, "text lookup component 46." should read --text input component 46.--.

In column 11, line 25, "followed either the pin" should read --followed by either the pin--.

In column 11, line 44, "68 an 72" should read --68 and 72--.

In column 12, line 36, "icon 62B" should read --icon 1062B--.

In column 12, line 37, "right the icon" should read --right of the icon--.

In column 13, lines 45-46, "actuation the <MENU> key" should read --actuation of the <MENU> key--.

In column 13, lines 46-47, "rotation the track ball" should read --rotation of the track ball--.

In column 13, line 66, "reduce menu 1035C" should read --reduced menu 1035C--.

In column 14, line 44, "cursor 1066" should read --indicator 1066--.

In column 15, line 6, "FIG. 16 depict" should read --FIG. 16 depicts--.

In column 15, line 18, "user through the user" should read --user through the use--.

In column 15, line 37, "variant component 1064A." should read --variant component 1072A.--.

In column 15, line 39, "strolling," should read --scrolling,--.

In column 15, line 42, "strolling," should read --scrolling,--.

In column 15, line 66, "10661" should read --1066I--.

In column 16, lines 36-37, "horizontal axis 34." should read --horizontal axis 34A.--.

In column 16, line 45, "plurality axes" should read --plurality of axes--.

In column 16, lines 55-56, "comprises a processor 2036 a memory 2040" should read --comprises a processor 2036 and a memory 2040--.

CERTIFICATE OF CORRECTION (continued)
U.S. Pat. No. 8,365,071 B2

In column 17, line 53, "Thus, and any pixel" should read --Thus, any pixel--.

In column 17, line 63, "touch screen display 2005" should read --touch screen display 2055--.

<u>In the Claims</u>:

In column 20, claim 6, lines 22-23, "focus to one of the one of the language objects" should read --focus to the one of the language objects--.

In column 22, claim 19, lines 37-38, "focus to one of the one of the language objects" should read --focus to the one of the language objects--.